(12) United States Patent
Kasahara et al.

(10) Patent No.: US 10,549,637 B2
(45) Date of Patent: Feb. 4, 2020

(54) HEAD-UP DISPLAY DEVICE (71) Applicant: NIPPON SEIKI CO., LTD., Niigata (JP)

(72) Inventors: Tsuyoshi Kasahara, Niigata (JP); Kazuya Matsuura, Niigata (JP); Takayuki Hatano, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 15/518,571

(22) PCT Filed: Oct. 13, 2015

(86) PCT No.: PCT/JP2015/078934
§ 371 (c)(1),
(2) Date: Apr. 12, 2017

(87) PCT Pub. No.: WO2016/060119
PCT Pub. Date: Apr. 21, 2016

(65) Prior Publication Data
US 2017/0225568 A1   Aug. 10, 2017

(30) Foreign Application Priority Data

Oct. 16, 2014 (JP) ................. 2014-211904

(51) Int. Cl.
*G02B 27/14* (2006.01)
*B60K 35/00* (2006.01)
(Continued)

(52) U.S. Cl.
CPC ............. *B60K 35/00* (2013.01); *G02B 27/01* (2013.01); *G02B 27/0101* (2013.01); *G09G 3/20* (2013.01);
(Continued)

(58) Field of Classification Search
CPC ............ B60K 35/00; B60K 2350/2069; B60K 2350/1072; B60K 2350/2052; G02B 27/0101; G02B 2027/0118; G02B 27/0172
See application file for complete search history.

(56) References Cited

U.S. PATENT DOCUMENTS 8,708,498 B2 * 4/2014 Sasaki ............... G02B 27/0093
353/13
9,004,691 B2   4/2015 Ishikawa
(Continued)

FOREIGN PATENT DOCUMENTS

EP        2690484 A1     1/2014
JP     2004-126226 A     4/2004
(Continued)

OTHER PUBLICATIONS

Search Report issued in corresponding International Patent Application No. PCT/JP2015/078934, dated Dec. 28, 2015.
(Continued)

*Primary Examiner* — Alicia M Harrington
(74) *Attorney, Agent, or Firm* — McDermott Will & Emery LLP (57) ABSTRACT

The purpose of the present invention is to efficiently orient image light toward an observer. A display device outputs projection light for displaying an image. A transmission type screen forms an image of the projection light and diffuses the same as image light. A projection lens enlarges projection light and forms the image on the transmission type screen. A light distribution adjustment means is disposed between the transmission type screen and the projection lens and adjusts the light distribution of the image light output by the transmission type screen for each region by refracting the projection light.

4 Claims, 7 Drawing Sheets

(51) Int. Cl.
*G02B 27/01* (2006.01)
*G09G 3/20* (2006.01)
*G09G 3/34* (2006.01)
*G09G 3/36* (2006.01)

(52) U.S. Cl.
CPC ............... *G09G 3/34* (2013.01); *G09G 3/36* (2013.01); *B60K 2370/155* (2019.05); *B60K 2370/334* (2019.05); *B60K 2370/349* (2019.05); *G02B 2027/0118* (2013.01)

(56) References Cited

U.S. PATENT DOCUMENTS

| | | | |
|---|---|---|---|
| 2011/0001639 A1* | 1/2011 | Sasaki | G02B 27/0101 340/995.19 |
| 2012/0099032 A1 | 4/2012 | Ishikawa | |
| 2013/0021224 A1* | 1/2013 | Fujikawa | G02B 27/0101 345/7 |

FOREIGN PATENT DOCUMENTS

| | | |
|---|---|---|
| JP | 2008-151992 A | 7/2008 |
| JP | 2012-093506 A | 5/2012 |

OTHER PUBLICATIONS

Extended Search Report issued in corresponding European Patent Application No. 15850928.1-1001/3208648, dated Feb. 26, 2018.

* cited by examiner

HEAD-UP DISPLAY DEVICE

CROSS REFERENCE

This application is the U.S. National Phase under 35 U.S.C. § 371 of International Application No. PCT/JP2015/078934, filed on Oct. 13, 2015, which claims the benefit of Japanese Application No. 2014-211904, filed on Oct. 16, 2014, the entire contents of each are hereby incorporated by reference.

TECHNICAL FIELD

The present invention relates to a head up display device for causing a virtual image superposed on a real view to be visually recognized.

BACKGROUND ART

Figure 7:
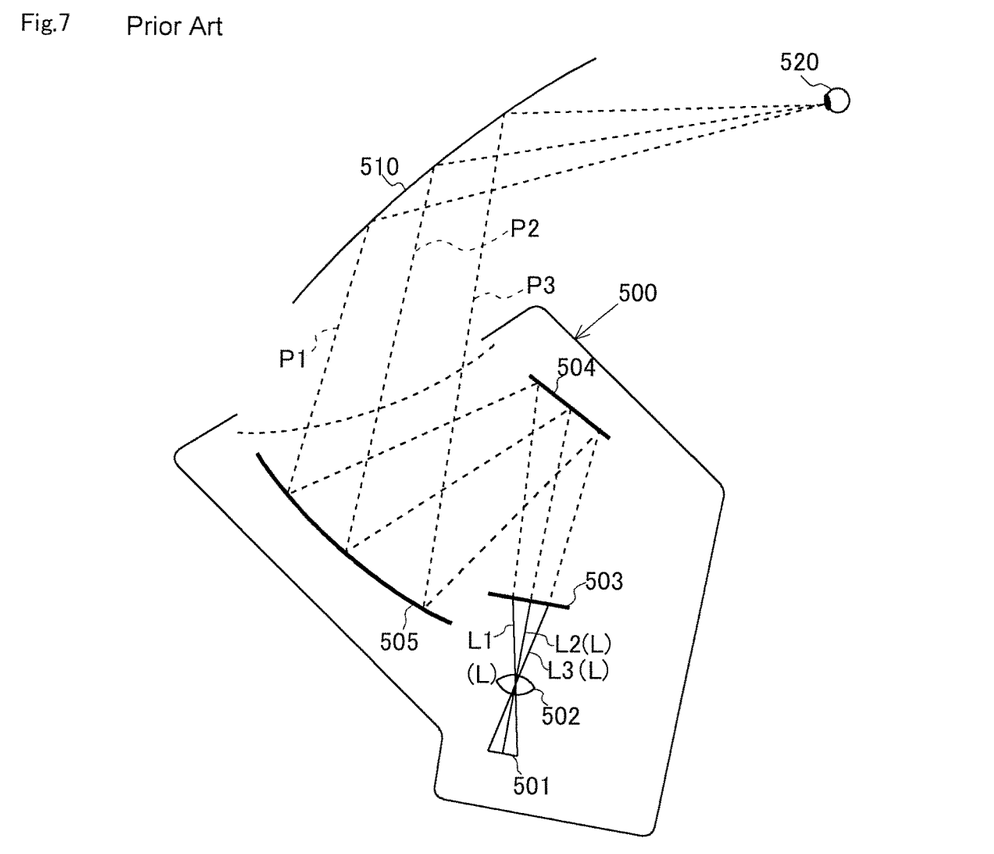
FIG. 7 is a schematic configuration diagram of a head up display device in a conventional example.
Figure 8:
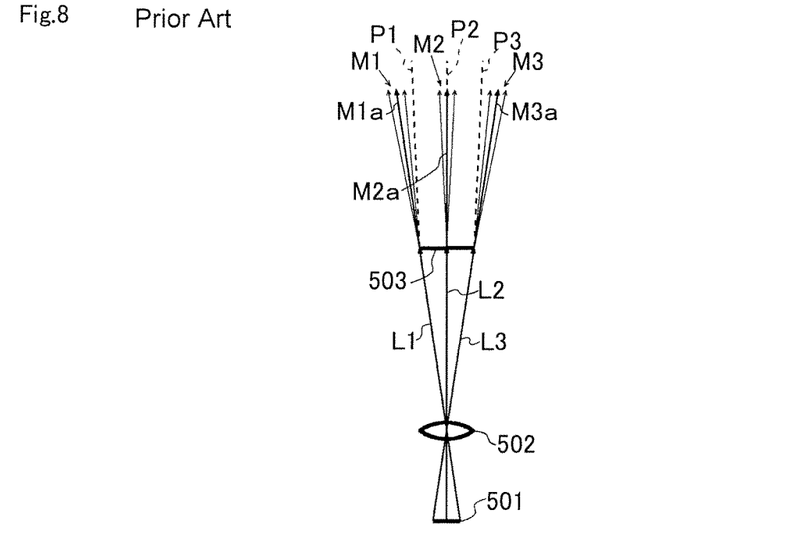
FIG. 8 is a schematic configuration diagram of light distribution adjustment means seen from a second direction in the conventional example.

A conventional head up display (HUD) device is disclosed in PTL 1. As shown in FIGS. 7 and 8, such an HUD includes a projector 501 for emitting projection light beams L1, L2, and L3, a projection lens 502 for causing images of the projection light beams L1, L2, and L3 to be formed on a transmission type screen 503, the transmission type screen 503 having a back surface that receives the projection light beams L1, L2, and L3 from the projection lens 502 and forms real images thereof and a front surface that diffuses and emits image light beams forming the real images, and a plane mirror 504 and a concave mirror 505 for directing image light beams M1, M2, and M3 diffused on the transmission type screen 503 to a windshield (projection reflection surface) 510 of a vehicle. P1, P2, and P3 shown in FIGS. 7 and 8 indicate optical paths of the image light beams contributing to a viewer visually recognizing a virtual image.

Projection light L directed from the projection lens 502 to the transmission type screen 503 is conically broadened toward the transmission type screen 503. The projection light beam L1 incident on the transmission type screen 503 is diffused by the transmission type screen 503 and is diffused as the image light beam M1 having, as an optical axis, a light distribution axis M1a having the same direction as that of the projection light beam L1. Similarly, the projection light beams L2 and L3 incident on the transmission type screen 503 are also diffused by the transmission type screen 503 and are diffused as the image light beams M2 and M3 having, as optical axes, light distribution axes M2a and M3a having the same directions as those of the projection light beams L2 and L3.

CITATION LIST

Patent Literature

PTL 1: JP-A-2004-126226

SUMMARY OF INVENTION

Technical Problem(s)

However, in the case where the projection light L from the projection lens 502 is directly projected onto the transmission type screen 503 as in PTL 1, the directions of the light distribution axes M1a, M2a, and M3a emitted from the transmission type screen 503 are substantially the same as those of the projection light beams L1, L2, and L3. Therefore, optical paths of the image light beams M1 and M3 emitted from predetermined regions of the transmission type screen 503 do not run along the optical paths P1 and P3 directed to a point of sight 520 of a viewer (the light distribution axes M1a and M3a do not match with the optical paths P1 and P3). Thus, an image light M reaching the point of sight 520 of the viewer is weak, and therefore luminance of a virtual image visually recognized by the viewer may be reduced. Further, the light distribution axes M1a and M3a of the image light beams M1 and M3 diffused in the respective regions of the transmission type screen 503 do not run along the optical paths P1 and P3 directed to the point of sight 520 of the viewer, and therefore light use efficiency of the image light beams M1 and M3 is reduced.

The invention has been made in view of the above circumstances, and an object is to provide a head up display device capable of efficiently directing image light to a viewer.

Solution to Problem(s)

In order to achieve the above object, a head up display device of a first invention includes: a projector for emitting projection light forming an image; a screen for allowing an image of the projection light to be formed and diffusing the projection light as image light; an imaging optical system for enlarging the projection light and forming the image of the projection light on the screen; and light distribution adjustment means for adjusting light distribution of the image light emitted from the screen in each region by refracting the projection light, the light distribution adjustment means being provided between the screen and the imaging optical system.

A head up display device of a second invention is such that the light distribution adjustment means adjusts the image light so that the image light emitted from each region of the screen is directed to an optical axis of the projection light.

A head up display device of a third invention is such that the light distribution adjustment means increases an adjustment amount of the projection light as the projection light is separated from an optical axis of the projection light in at least a first direction between the first direction and a second direction, the first direction extending in a direction vertical to the optical axis of the projection light and the second direction extending in a direction vertical to the optical axis of the projection light and orthogonal to the first direction.

Advantageous Effects of Invention

According to the invention, it is possible to efficiently direct image light to a viewer.

BRIEF DESCRIPTION OF DRAWINGS

FIG. 2 In the above embodiment.

FIG. 3 In a second embodiment.

FIG. 5 In the above embodiment.

DESCRIPTION OF EMBODIMENTS

First Embodiment

A first embodiment of the invention will be described with reference to the drawings.

Figure 1:
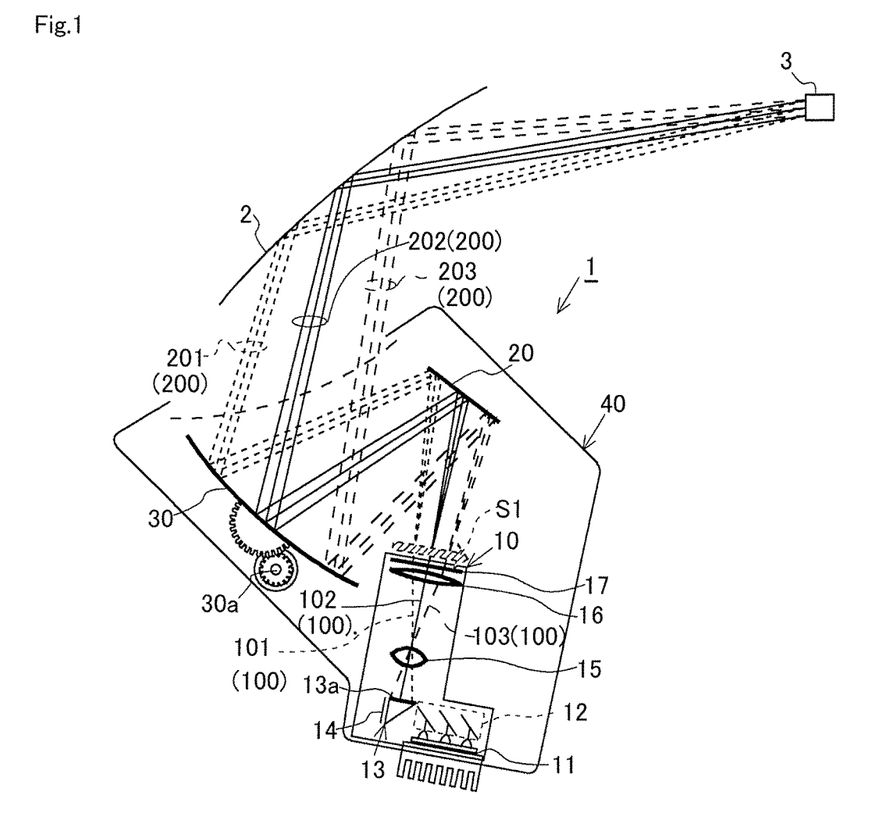
FIG. 1 is a schematic configuration diagram of a head up display device in a first embodiment of the invention.

FIG. 1 is a schematic configuration diagram showing a configuration of a head up display device (hereinafter, referred to as "HUD device") 1 according to this embodiment. The HUD device 1 according to this embodiment is provided in a dashboard of a vehicle. The HUD device 1 emits an image light 200 toward a windshield 2 of the vehicle. The image light 200 reflected by the windshield 2 is directed to an eye box 3. In the case where a user's point-of-sight position is in the eye box 3, the user visually recognizes a virtual image having desired luminance generated by the image light 200. The user recognizes the virtual image via the windshield 2 as if the virtual image is located in a distant place while the virtual image is being superposed on a real view in front of the vehicle.

As shown in FIG. 1, the HUD device 1 includes a display device 10 for displaying a real image S1 and emitting the image light 200 forming the real image S1, a first reflection unit 20 for reflecting the image light 200 emitted by the display device 10, a second reflection unit 30 for enlarging the image light 200 reflected by the first reflection unit 20 and directing the image light 200 to the windshield 2, a housing 40 storing the above members, and a control unit (not shown) for electrically controlling the HUD device 1.

(Display Device 10)

As shown in FIG. 1, the display device 10 includes a light source 11 for emitting irradiation light (not shown), light source mirrors 12, a prism 13, a reflection type display device 14, a projection lens 15, light distribution adjustment means 16, and a transmission type screen 17. The display device 10 forms the real image S1 on the transmission type screen 17 and emits the image light 200 forming the real image S1 toward the first reflection unit 20.

The light source 11 includes, for example, a plurality of LEDs capable of outputting light of red, blue, and green and emits the irradiation light of desired color with desired light intensity at a desired timing under the control of the control unit. The display device 10 in this embodiment employs a field sequential color driving method, and the light source 11 of each color emits the irradiation light in time division.

The light source mirror 12 is, for example, a dichroic mirror for reflecting light having a specific wavelength and transmitting light having the other wavelengths. The light source mirror 12 aligns courses of light of red, blue, and green emitted from the plurality of light sources 11 to direct the courses thereof to the prism 13 and causes the irradiation light from the light source 11 to be incident on the prism 13 at a proper angle.

The prism 13 is provided between the light source mirror 12 and the reflection type display device 14 and has an inclined plane that is inclined at a predetermined angle with respect to an optical axis of the irradiation light incident from the light source mirror 12. The irradiation light incident on the inclined plane from the light source mirror 12 is transmitted through the inclined plane and is incident on the reflection type display device 14. Then, projection light 100 emitted from the reflection type display device 14 is incident on the prism 13 again and is reflected by the inclined plane toward the projection lens 15, and the projection light 100 is emitted from a projection surface 13a.

The reflection type display device 14 is, for example, a reflection type display device such as a DMD (Digital Micromirror Device) or an LCOS (registered trademark: Liquid Crystal On Silicon). The reflection type display device 14 converts the irradiation light incident from the prism 13 into the projection light 100 for displaying a virtual image under the control of the control unit and reflects the projection light toward the prism 13.

The projection lens 15 is made up of, for example, a convex lens having a spherical surface and enlarges the projection light 100 incident from the prism 13 and emits the projection light 100 toward the light distribution adjustment means 16. The projection lens 15 is an imaging optical system for receiving the projection light 100 from the reflection type display device 14 and forming the real image S1 on the transmission type screen 17 described below.

Figure 2:
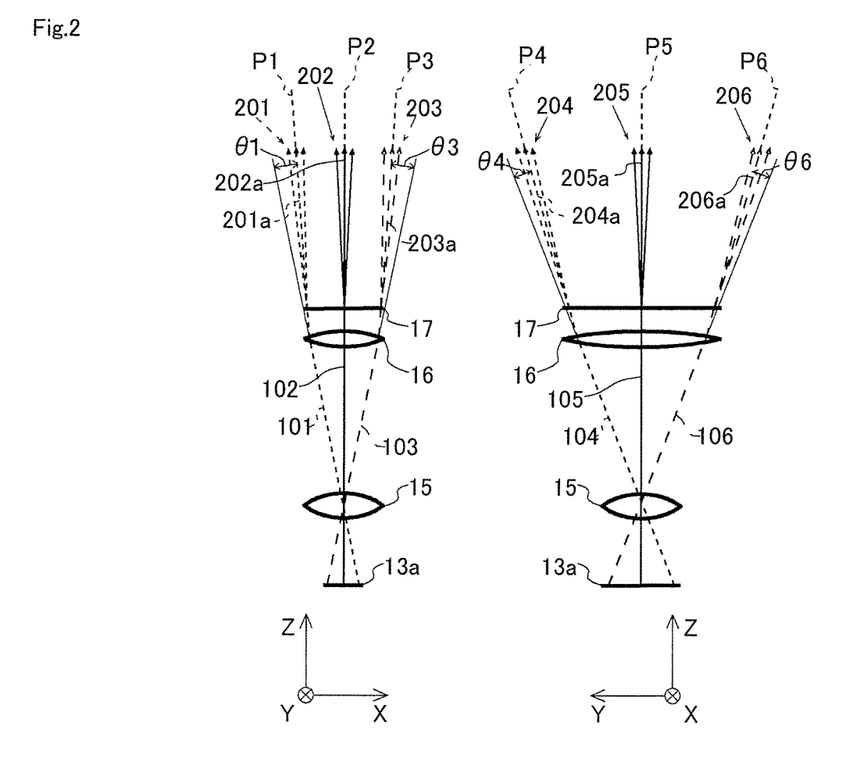
FIG. 2(a) is a schematic configuration diagram of light distribution adjustment means seen from a second direction and FIG. 2(b) is a schematic configuration diagram of the light distribution adjustment means seen from a first direction.

As shown in FIG. 2, the light distribution adjustment means 16 is a biconvex lens having free-form surfaces whose curvatures are different between a first direction X extending in a direction vertical to an optical axis (102) of the projection light and a second direction Y orthogonal to this first direction X and is provided on an optical path of the projection light 100 directed from the projection lens 15 to the transmission type screen 17. The light distribution adjustment means 16 adjusts light distribution of the image light 200 emitted from regions of the transmission type screen 17 by refracting the projection light 100 directed from the projection surface 13a to the transmission type screen 17. Specific effects of the light distribution adjustment means 16 will be described in detail below.

The transmission type screen 17 is, for example, a diffusion film made of resin such as polycarbonate. The transmission type screen 17 allows an image of the projection light 100 emitted from the projection lens 15 to be formed as the real image S1 and emits the image light 200 diffused in a constant distribution. Note that light distribution of the image light 200 emitted from the transmission type screen 17 is adjusted in each region of the transmission type screen 17 by effects of the light distribution adjustment means 16.

In the display device 10 described above, the reflection type display device 14 generates the projection light 100 and emits the projection light 100 through the projection surface 13a, and the projection lens 15 forms an image of the projection light 100 on the transmission type screen 17 as the real image S1. Then, the light distribution adjustment means 16 refracts the projection light 100 directed from the projection lens 15 to the transmission type screen 17, thereby adjusting light distribution of the image light 200 emitted from the regions of the transmission type screen 17. Thus, it is possible to efficiently direct the image light 200 in a direction of the eye box 3.

The first reflection unit 20 is a plane mirror and is obtained by forming a reflective film on a surface of a base made of, for example, a synthetic resin material or glass material by using depositing or other means. The first reflection unit 20 reflects the image light 200 diffused by and transmitted through the transmission type screen 17 toward the second reflection unit 30 described below.

The second reflection unit 30 is a concave mirror and is obtained by forming a reflective film on a surface of abase made of, for example, a synthetic resin material by using depositing or other means. The second reflection unit 30 has a reflection surface having a concave free-form surface, and a detailed shape of the surface thereof is calculated on the basis of a positional relationship with the transmission type screen 17, the first reflection unit 20, the windshield 2 (reflection-transmission surface), and the eye box 3, a curvature of the windshield 2, a required imaging distance of the virtual image, an angle of view of the HUD device 1 visually recognized by the user, and the like. The second reflection unit 30 can be designed so that distortion of the virtual image is minimized. Further, the second reflection unit 30 enlarges the image light 200 reflected by the first reflection unit 20 and reflects the image light 200 toward the windshield 2.

The second reflection unit 30 includes an actuator 30a capable of adjusting an angle of the second reflection unit 30. The actuator 30a can direct the image light 200 to the eye box 3 by rotating the second reflection unit 30 in accordance with a viewer's point-of-sight position detected by point-of-sight position detection means (not shown) made up of a camera or the like. The actuator 30a may rotate the second reflection unit 30 in accordance with operation of an operation unit (not shown).

Hereinabove, the configuration of the HUD device 1 in this embodiment has been described. Hereinafter, effects of the light distribution adjustment means 16 will be described with reference to FIG. 2. FIG. 2(*a*) is a schematic configuration diagram of the light distribution adjustment means 16 seen from the second direction Y, and FIG. 2(*b*) is a schematic configuration diagram of the light distribution adjustment means 16 seen from the first direction X.

(Effects of Light Distribution Adjustment Means 16)

An effect of the light distribution adjustment means 16, which is obtained by seeing the light distribution adjustment means 16 from the second direction Y, will be described with reference to FIG. 2(*a*). Note that the projection light 100 (projection light 101, projection light 102, and projection light 103) emitted from the projection surface 13a shown in FIG. 2(*a*) is light forming a vertical direction of the virtual image visually recognized by the viewer. The projection light 101 forms a lower end of the virtual image, the projection light 102 forms a part in the vicinity of the vertical center of the virtual image, and the projection light 103 forms an upper end of the virtual image.

The projection light 100 (projection light 101, projection light 102, and projection light 103) emitted from the regions of the projection surface 13a is incident on the light distribution adjustment means 16 via the projection lens 15. The light distribution adjustment means 16 refracts the projection light 101, the projection light 102, and the projection light 103 incident on the transmission type screen 17 so that a light distribution axis 201a, a light distribution axis 202a, and a light distribution axis 203a of image light 201, image light 202, and image light 203 emitted from the transmission type screen 17 substantially run along an optical path P1, an optical path P2, and an optical path P3 directed to the eye box 3.

In the first direction X, the light distribution adjustment means 16 largely refracts the projection light 100 (projection light 101 and projection light 103) incident on positions apart from an optical axis of the light distribution adjustment means 16 and emits the projection light 100 toward the transmission type screen 17. Specifically, the light distribution adjustment means 16 inclines the projection light 101 by an angle θ1 and the projection light 103 by an angle θ3 toward the optical axis of the light distribution adjustment means 16 and emits the projection light 101 and the projection light 103. Note that the projection light 102 along the optical axis of the light distribution adjustment means 16 forms an image on the transmission type screen 17 without being refracted by the light distribution adjustment means 16 (without being adjusted by the light distribution adjustment means 16 in terms of light distribution thereof) and is emitted as the image light 202. The light distribution adjustment means 16 increases an adjustment amount (angle to be inclined) of the projection light 100 as the projection light 100 is separated from the optical axis of the light distribution adjustment means 16.

Next, an effect of the light distribution adjustment means 16, which is obtained by seeing the light distribution adjustment means 16 from the first direction X, will be described with reference to FIG. 2(*b*). Note that the projection light 100 (projection light 104, projection light 105, and projection light 106) emitted from the projection surface 13a shown in FIG. 2(*b*) is light forming a horizontal direction of the virtual image visually recognized by the viewer. The projection light 104 forms a right end of the virtual image, the projection light 105 forms a part in the vicinity of the horizontal center of the virtual image, and the projection light 106 forms a left end of the virtual image.

The projection light 100 (projection light 104, projection light 105, and projection light 106) emitted from the regions of the projection surface 13a is incident on the light distribution adjustment means 16 via the projection lens 15. The light distribution adjustment means 16 refracts the projection light 104, the projection light 105, and the projection light 106 incident on the transmission type screen 17 so that a light distribution axis 204a, a light distribution axis 205a, and a light distribution axis 206a of image light 204, image light 205, and image light 206 emitted from the transmission type screen 17 substantially run along an optical path P4, an optical path P5, and an optical path P6 directed to the eye box 3.

In the second direction Y, the light distribution adjustment means 16 largely refracts the projection light 100 (projection light 104 and projection light 106) incident on positions apart from the optical axis of the light distribution adjustment means 16 and emits the projection light 100 toward the transmission type screen 17. Specifically, the light distribution adjustment means 16 inclines the projection light 104 by an angle θ4 and the projection light 106 by an angle θ6 toward the optical axis of the light distribution adjustment means 16 and emits the projection light 104 and the projection light 106. Note that the projection light 105 along the optical axis of the light distribution adjustment means 16 forms an image on the transmission type screen 17 without being refracted by the light distribution adjustment means 16 (without being adjusted by the light distribution adjustment means 16 in terms of light distribution thereof) and is emitted as the image light 205. The light distribution adjustment means 16 increases an adjustment amount (angle to be inclined) of the projection light 100 as the projection light 100 is separated from the optical axis of the light distribution adjustment means 16. Note that the angle θ1 and the angle θ3 (adjustment amounts) at which the image light 201 and the image light 203 distributed in a vertical direction of the eye box 3 are refracted by the light distribution adjustment means 16 are larger than the angle θ4 and the angle θ6 (adjustment amounts) at which the image light 204 and the image light 206 distributed in a horizontal direction of the eye box 3 are refracted.

As described above, according to the HUD device 1 in this embodiment, light distribution of the image light 200 emitted from the regions of the transmission type screen 17 can be adjusted by the light distribution adjustment means 16, and therefore it is possible to efficiently direct the image light 200 to the eye box 3.

Second Embodiment

Figure 3:
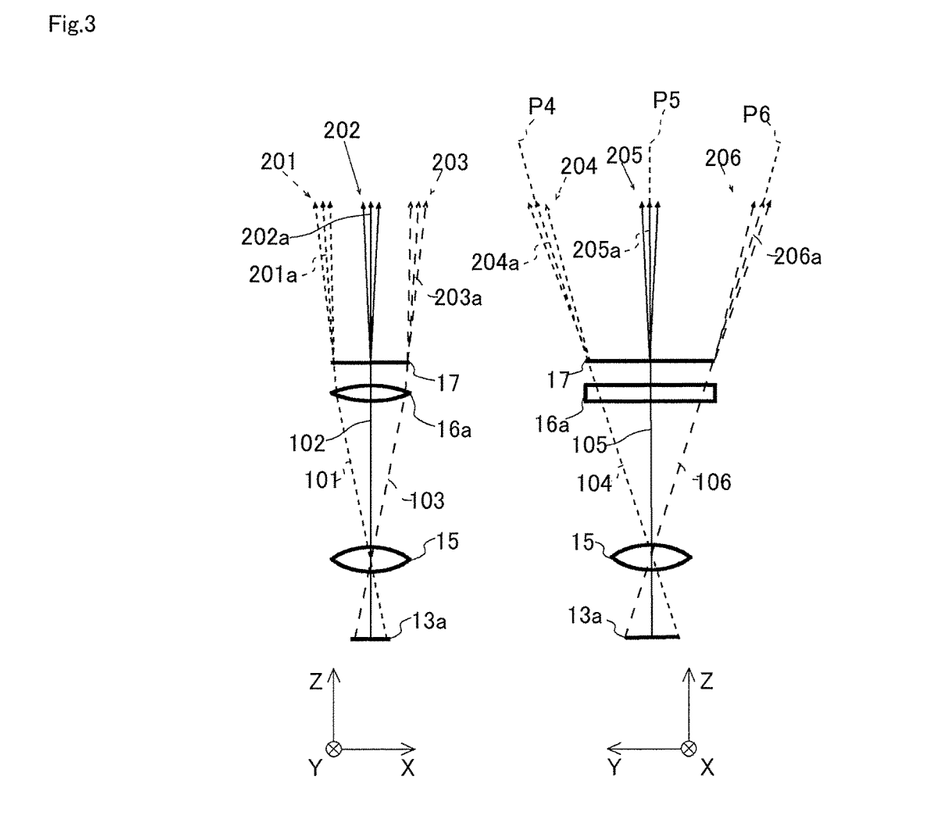
FIG. 3(a) is a schematic configuration diagram of light distribution adjustment means seen from a second direction and FIG. 3(b) is a schematic configuration diagram of the light distribution adjustment means seen from a first direction.

Hereinafter, effects of light distribution adjustment means 16a in a second embodiment will be described with reference to FIG. 3. FIG. 3(a) is a schematic configuration diagram of the light distribution adjustment means 16a seen from the second direction Y, and FIG. 3(b) is a schematic configuration diagram of the light distribution adjustment means 16a seen from the first direction X. Note that, in FIG. 3, configurations the same as the configurations in the above first embodiment are denoted by the same reference signs, and description thereof will be omitted.

The HUD device 1 in the second embodiment is different in that the HUD device 1 includes the light distribution adjustment means 16a having a characteristic different from that of the light distribution adjustment means 16 in the above first embodiment. The light distribution adjustment means 16a in the second embodiment is a cylindrical lens that has power to refract the projection light 100 in the first direction X and does not have power to refract the projection light 100 in the second direction Y.

An effect of the light distribution adjustment means 16, which is obtained by seeing the light distribution adjustment means 16a in the second embodiment from the first direction X, will be described with reference to FIG. 3(b).

The projection light 100 (projection light 104, projection light 105, and projection light 106) emitted from the regions of the projection surface 13a is incident on the light distribution adjustment means 16a via the projection lens 15. The light distribution adjustment means 16a emits the projection light 104, the projection light 105, and the projection light 106 toward the transmission type screen 17 without changing directions of the projection light 104, the projection light 105, and the projection light 106. The transmission type screen 17 emits the image light 204, the image light 205, and the image light 206 having the light distribution axis 204a, the light distribution axis 205a, and the light distribution axis 206a whose directions are substantially the same as those of the projection light 104, the projection light 105, and the projection light 106 incident on a back surface thereof. Note that projection angles of the projection light 104, the projection light 105, and the projection light 106 from the projection lens 15 are set so that the light distribution axis 204a, the light distribution axis 205a, and the light distribution axis 206a run along the optical path P4, the optical path P5, and the optical path P6 directed to the eye box 3.

Also in such a configuration, light distribution of the image light 200 emitted from the regions of the transmission type screen 17 can be adjusted by the light distribution adjustment means 16a, and therefore it is possible to efficiently direct the image light 200 to the eye box 3. Further, the light distribution adjustment means 16a has power to refract the projection light 100 only in one axial direction (first direction X), and therefore it is possible to facilitate an optical design of the light distribution adjustment means 16a.

Third Embodiment

Figure 4:
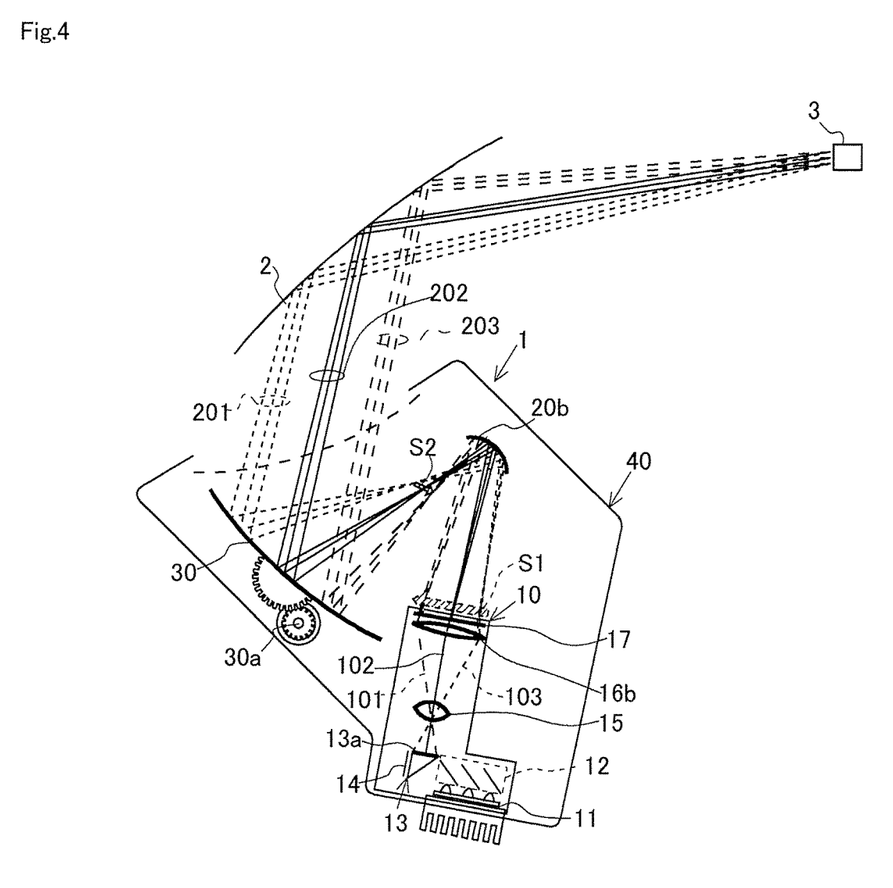
FIG. 4 is a schematic configuration diagram of a head up display device in a third embodiment of the invention.
Figure 5:
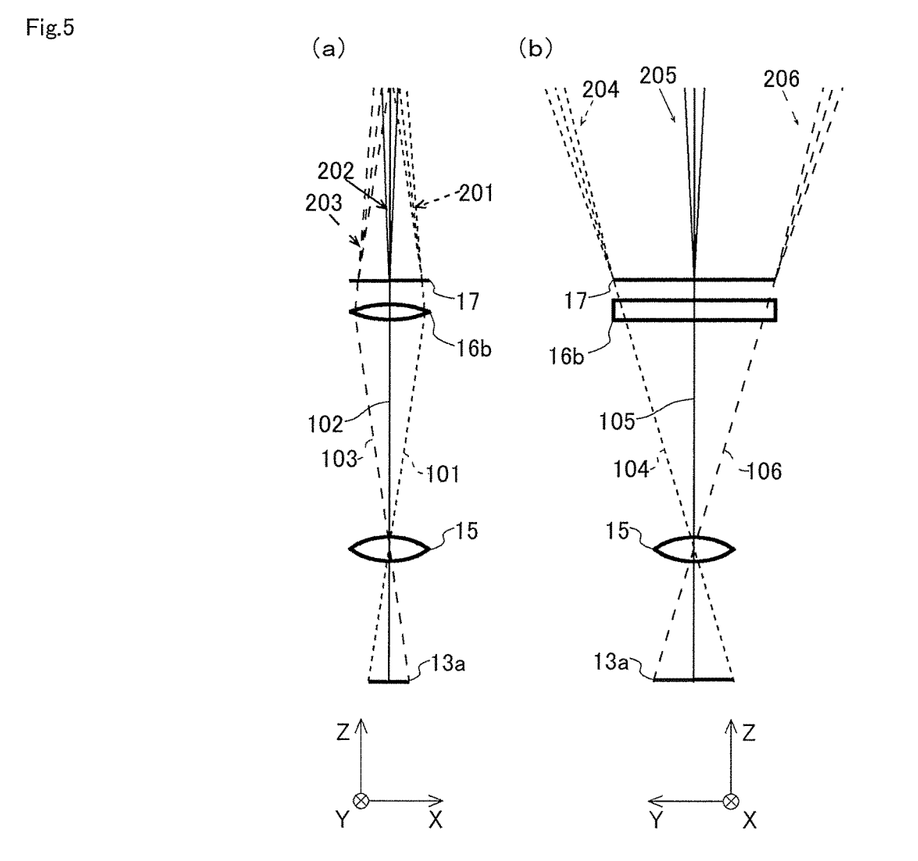
FIG. 5(a) is a schematic configuration diagram of light distribution adjustment means seen from a second direction and FIG. 5(b) is a schematic configuration diagram of the light distribution adjustment means seen from a first direction.

The HUD device 1 in a third embodiment is different in that the image light 201, the image light 202, and the image light 203 emitted from the regions of the transmission type screen 17 intersect with one another and form an intermediate image S2 at a predetermined position. Hereinafter, the third embodiment of the invention will be described with reference to FIGS. 4 and 5. FIG. 4 is a schematic configuration diagram of the HUD device 1 in the third embodiment. FIG. 5(a) is a schematic configuration diagram of light distribution adjustment means 16b seen from the second direction Y, and FIG. 5(b) is a schematic configuration diagram of the light distribution adjustment means 16b seen from the first direction X.

The light distribution adjustment means 16b in the third embodiment is, for example, a cylindrical lens, and an optical region that receives the projection light 100 and emits the refracted projection light 100 toward the transmission type screen 17 is formed to be larger than a region where the transmission type screen 17 forms the real image S1.

Effects of Light Distribution Adjustment Means 16b

An effect of the light distribution adjustment means 16b, which is obtained by seeing the light distribution adjustment means 16b from the second direction Y, will be described with reference to FIG. 5(a).

The projection light 100 (projection light 101, projection light 102, and projection light 103) emitted from the regions of the projection surface 13a is incident on the light distribution adjustment means 16b via the projection lens 15. The light distribution adjustment means 16b refracts the projection light 101, the projection light 102, and the projection light 103 so that the light distribution axis 201a, the light distribution axis 202a, and the light distribution axis 203a of the image light 201, the image light 202, and the image light 203 emitted from the transmission type screen 17 substantially run along the optical path P1, the optical path P2, and the optical path P3 directed to the eye box 3 and emits the projection light 101, the projection light 102, and the projection light 103 toward the transmission type screen 17.

In the first direction X, the projection light 100 (projection light 101 and projection light 103) incident on positions apart from an optical axis of the light distribution adjustment means 16b is largely refracted and is emitted toward the transmission type screen 17. Specifically, the light distribution adjustment means 16b inclines the projection light 101 and the projection light 103 so that the projection light 101 and the projection light 103 are directed to the optical axis of the light distribution adjustment means 16b and emits the projection light 101 and the projection light 103. With this, the whole image light 200 is directed to the first reflection unit 20 while being converged, and therefore a small first reflection unit 20 can receive the image light 200. The light distribution adjustment means 16b increases an adjustment amount (angle to be inclined) of the projection light 100 as the projection light 100 is separated from the optical axis of the light distribution adjustment means 16b.

In the HUD device 1 in the third embodiment, the first reflection unit 20b is made up of a concave mirror in order to form the intermediate image S2 with the image light 200 emitted from the transmission type screen 17. The first reflection unit 20 forms the image light 200 of the real image S1 formed on the transmission type screen 17 as the intermediate image S2 between the first reflection unit 20 and the second reflection unit 30. An imaging position of the intermediate image S2 is set to be closer to the second reflection unit 30 than a focal length of the second reflection unit 30 and be in the vicinity of the focal length of the second reflection unit 30. This makes it possible to cause a viewer to visually recognize a high-magnification virtual image.

As described above, the HUD device 1 in the third embodiment directs a light distribution axis 200a of the image light 200 emitted from each region of the transmission type screen 17 to the optical axis of the light distribution adjustment means 16b by using the light distribution adjustment means 16b, and therefore it is possible to efficiently generate the intermediate image S2 with the small first reflection unit 20.

The invention is not limited by the above embodiments and the drawings. It is possible to make modification (including deletion of constituent elements) as appropriate without deviating from the scope of the present invention. Hereinafter, modification examples will be described.

In the above embodiments, the light distribution adjustment means 16 for refracting the projection light 100 from the projection lens 15 is a free-form surface lens or a cylindrical lens. However, the light distribution adjustment means 16 is not limited thereto and may be a rotationally symmetric lens or a toroidal lens having a spherical or aspherical surface as appropriate.

In the above embodiments, the light distribution adjustment means 16 is made up of a lens. However, the light distribution adjustment means 16 may be made up of a mirror having a concave surface.

In the above embodiments, the transmission type screen 17 is a diffusion film. However, the transmission type screen 17 may be made up of a microlens array. When the transmission type screen 17 is made up of a microlens array, a magnitude of a light distribution angle and a light distribution direction of the image light 200 emitted from each region of the transmission type screen 17 can be adjusted in each region of the transmission type screen 17. Therefore, it is possible to direct the image light 200 to a viewer more efficiently.

Figure 6:
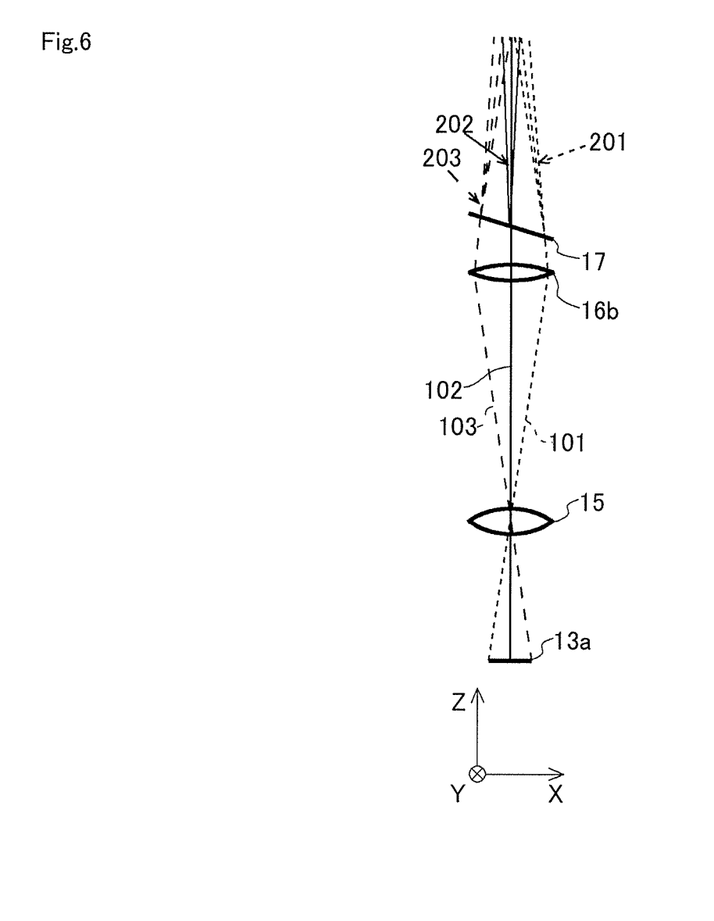
FIG. 6 is a schematic configuration diagram of light distribution adjustment means seen from a second direction in a modification example.

In the above embodiments, the transmission type screen 17 is provided to be vertical to the optical axis of the light distribution adjustment means 16. However, as shown in FIG. 6, the transmission type screen 17 may be inclined with respect to the optical axis of the light distribution adjustment means 16 in the first direction X or/and the second direction Y. With this configuration, it is possible to prevent sunlight entering from the outside of the HUD device 1 from being transmitted through the transmission type screen 17 to be propagated to the light source mirror 12 and the light source 11.

The reflection-transmission surface onto which the image light 200 is projected is not limited to the windshield 2 of the vehicle. The reflection-transmission surface onto which the image light 200 is projected may be, for example, a combiner member provided dedicatedly.

In the above description, in order to easily understand the invention, description of publicly-known unimportant technical matters has been omitted as appropriate.

Industrial Applicability

The invention relates to a head up display device for causing a virtual image superposed on a real view to be visually recognized and is suitable as, for example, a display device for emitting image light toward a windshield of a vehicle, the display device being provided in a dashboard of the vehicle.

REFERENCE SIGNS LIST

1 HUD device (head up display device)
2 windshield (reflection-transmission surface)
3 eye box
10 display device
11 light source
12 light source mirror
13 prism
14 reflection type display device (projector)
15 projection lens (imaging optical system)
16 light distribution adjustment means
17 transmission type screen (screen)
20 first reflection unit
30 second reflection unit
40 housing
100 projection light
200 image light

The invention claimed is:

1. A head up display device, comprising:
   a projector for emitting projection light forming an image, the projection light propagating along an optical axis;
   a screen for allowing an image of the projection light to be formed and diffusing the projection light as image light;
   an imaging optical system for enlarging the projection light and forming the image of the projection light on the screen;
   light distribution adjustment means provided between the screen and the imaging optical system, the light distribution adjustment means configured to 1) refract or reflect the projection light toward the screen, 2) converge the projection light toward the optical axis, and 3) allow the image light from the screen to converge toward the optical axis; and
   a reflector for reflecting the image light from the screen.

2. The head up display device according to claim 1, wherein
   the light distribution adjustment means increases an adjustment amount of the projection light as the projection light is separated from the optical axis in one of a first direction perpendicular to the optical axis, and a second direction perpendicular to both of the optical axis and the first direction.

3. The head up display device according to claim 1, wherein
   the optical axis passes a center of the screen, a first direction being perpendicular to the optical axis, and a second direction being perpendicular to both of the optical axis and the first direction,
   the screen has a first area, a second area, and a third area which are arranged at least along the first direction in that order, wherein the second area is located at the center of the screen, through which the optical axis passes, and
   the light distribution adjustment means is configured to change a traveling direction of a first portion of the projection light toward the first area and change a traveling direction of a second portion of the projection light toward the third area in order to converge the first and second portions of the projection light toward the optical axis.

4. The head up display device according to claim 1, wherein the light distribution adjustment means comprises one of a lens and a mirror.

* * * * *